(12) United States Patent
Kessler et al.

(10) Patent No.: US 9,390,023 B2
(45) Date of Patent: Jul. 12, 2016

(54) METHOD AND APPARATUS FOR CONDITIONAL STORING OF DATA USING A COMPARE-AND-SWAP BASED APPROACH

(71) Applicant: Cavium, Inc., San Jose, CA (US)

(72) Inventors: Richard E. Kessler, Northborough, MA (US); David H. Asher, Sutton, MA (US); Michael Sean Bertone, Marlborough, MA (US); Shubhendu S. Mukherjee, Southborough, MA (US); Wilson P. Snyder, II, Holliston, MA (US); John M. Perveiler, Oxford, MA (US); Christopher J. Comis, Framingham, MA (US)

(73) Assignee: Cavium, Inc., San Jose, CA (US)

( * ) Notice: Subject to any disclaimer, the term of this patent is extended or adjusted under 35 U.S.C. 154(b) by 226 days.

(21) Appl. No.: 14/045,674

(22) Filed: Oct. 3, 2013

(65) Prior Publication Data

US 2015/0100737 A1    Apr. 9, 2015

(51) Int. Cl.
*G06F 12/00*    (2006.01)
*G06F 12/08*    (2016.01)
*G06F 9/30*    (2006.01)
*G06F 9/00*    (2006.01)

(52) U.S. Cl.
CPC .............. *G06F 12/0888* (2013.01); *G06F 9/00* (2013.01); *G06F 9/3004* (2013.01); *G06F 9/30043* (2013.01); *G06F 9/30072* (2013.01); *G06F 12/0815* (2013.01); *G06F 2209/521* (2013.01)

(58) Field of Classification Search
CPC ........... G06F 9/00; G06F 9/3004; G06F 9/52; G06F 2209/521; G06F 12/0888; G06F 12/0815
See application file for complete search history.

(56) References Cited

U.S. PATENT DOCUMENTS

| | | | | |
|---|---|---|---|---|
| 6,112,282 A * | 8/2000 | Lynch | ...................... | G06F 9/52 711/144 |
| 6,163,837 A * | 12/2000 | Chan | ................... | G06F 9/30141 712/216 |
| 6,615,340 B1 * | 9/2003 | Wilmot, II | ............ | G06F 9/3004 712/209 |
| 7,937,419 B2 * | 5/2011 | Ylonen | ............... | G06F 12/0253 707/813 |
| 8,578,380 B1 * | 11/2013 | Adams | .................... | G06F 9/526 718/100 |
| 2005/0010743 A1 * | 1/2005 | Tremblay | .............. | G06F 9/3001 712/10 |
| 2008/0010284 A1 | 1/2008 | Beck | | |
| 2009/0327372 A1 * | 12/2009 | Ylonen | ............... | G06F 12/0253 |
| 2013/0254488 A1 * | 9/2013 | Kaxiras | ............... | G06F 12/0815 711/130 |
| 2014/0282558 A1 | 9/2014 | Brooker | | |
| 2015/0100747 A1 | 4/2015 | Kessler et al. | | |

* cited by examiner

*Primary Examiner* — John Lane
(74) *Attorney, Agent, or Firm* — Hamilton, Brook, Smith & Reynolds, P.C.

(57) ABSTRACT

According to at least one example embodiment, a method and corresponding apparatus for conditionally storing data include initiating an atomic sequence by executing, by a core processor, an instruction/operation designed to initiate an atomic sequence. Executing the instruction designed to initiate the atomic sequence includes loading content associated with a memory location into a first cache memory, and maintaining an indication of the memory location and a copy of the corresponding content loaded. A conditional storing operation is then performed, the conditional storing operation includes a compare-and-swap operation, executed by a controller associated with a second cache memory, based on the maintained copy of the content and the indication of the memory location.

21 Claims, 3 Drawing Sheets

METHOD AND APPARATUS FOR CONDITIONAL STORING OF DATA USING A COMPARE-AND-SWAP BASED APPROACH

BACKGROUND

In hardware systems, atomic sequences are designed to enable execution of a sequence of instructions uninterrupted. As such, atomic sequences provide a framework for executing a sequence of instructions while ensuring that the memory space associated with the sequence of instructions is not accessed or modified by any other instruction or operation.

SUMMARY

According to at least one example embodiment, a method and corresponding apparatus for conditionally storing data include initiating an atomic sequence by executing, by a core processor, an instruction/operation designed to initiate an atomic sequence. Executing the instruction designed to initiate the atomic sequence includes loading content associated with a memory location and maintaining an indication of the memory location and a copy of the corresponding content loaded. A conditional storing operation is then performed, the conditional storing operation includes a compare-and-swap operation, executed by a controller associated with cache memory, based on the maintained copy of the content and the indication of the memory location.

According to an example implementation, the content associated with the memory location is loaded in a first cache memory whereas the memory associated with the controller is a second cache memory. The maintained copy of the content and the indication of the memory location are provided, by the core processor, to the second cache memory. The compare-and-swap operation includes comparing, by the controller, the copy of the content maintained with a current content stored in the memory location. If a match is found between the copy of the content maintained and the current content stored in the memory location, the data associated with the conditional storing operation is stored in the memory location. However, if no match is determined, the conditional storing operation is failed.

According to at least one example embodiment, the controller is further configured to invalidate cache blocks, corresponding to a cache block associated with the conditional storing operation, in cache memories associated with other core processors. Invalidating the cache blocks is performed based on information indicative of which core processors store cache blocks, corresponding to the cache block associated with the conditional storing operation.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
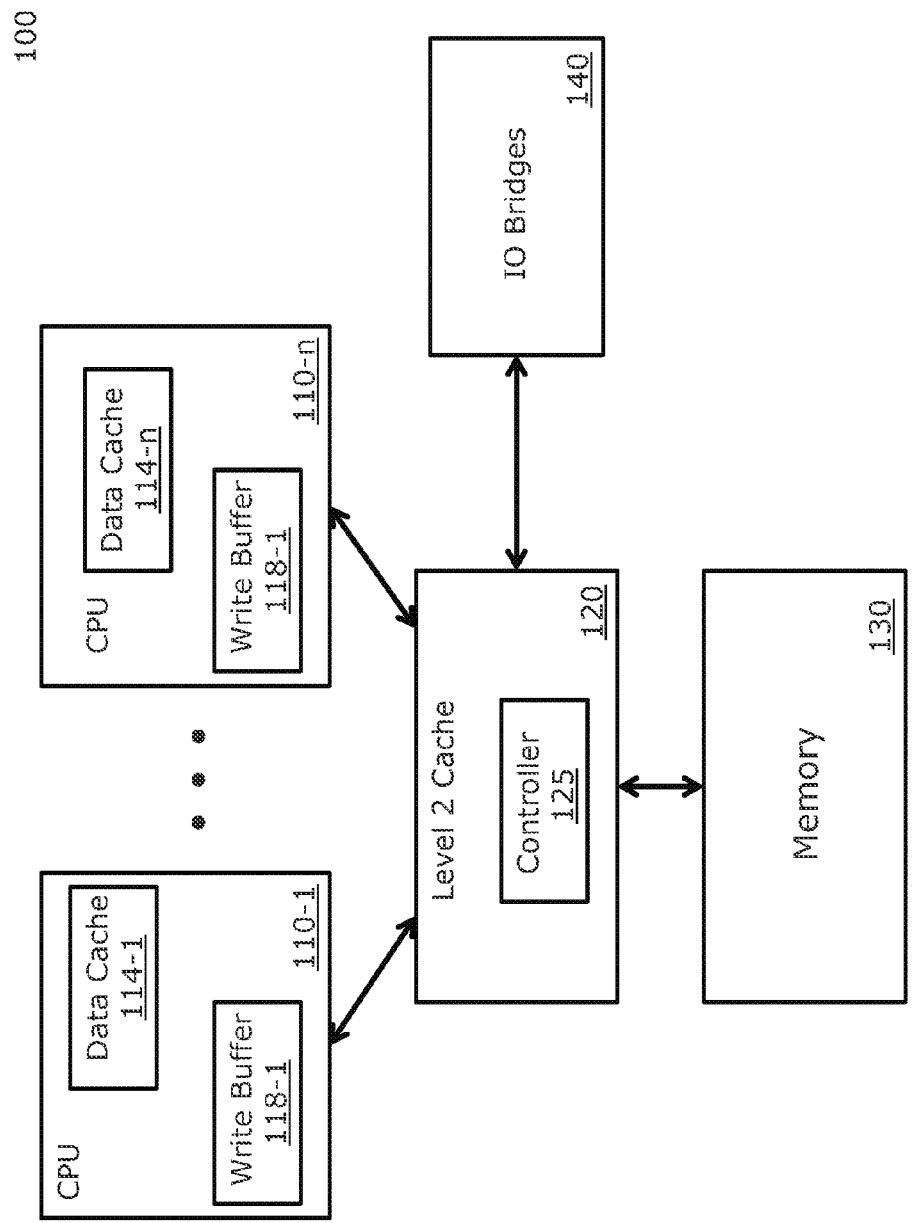
FIG. 1 is a block diagram of a multi-core hardware system illustrating conditional storing of data, according to at least one example embodiment.

A description of example embodiments of the invention follows.

Many processor instruction sets include instruction sequences that enable atomic accesses to shared memory locations. Such sequences start with an instruction to load content of a memory location and terminate with an instruction to conditionally store to a memory location. In many cases, the memory location from which content is loaded is the same memory location that is conditionally-stored to. If the instruction sequence is not interrupted and no other agents, e.g., other core processors than the one executing the sequence, in the hardware system modify the content of the memory location between the execution of the load and the store instructions, then the conditional store instruction is allowed to modify the memory location. Otherwise, the conditional store may fail and the software may choose to retry sequence. Atomic memory updates are commonly employed in multi-core synchronization. The instruction sequences enabling atomic access are known as atomic sequences.

An atomic sequence enables defining an un-interruptible sequence of instructions, or operations. In other words, once an atomic sequence is initiated, the final result will not be stored in memory only if the memory references in the atomic sequence have executed atomically. As such, atomic sequences provide a framework for executing a sequence of instructions while ensuring that the memory space associated with the sequence of instructions is not accessed or modified by any other instruction or operation.

The instruction sequence below represents an atomic sequence using the MIPS64 instruction set.

```
Label:
   LLD $5, 0($6)
   DADDIU $5, $5, 1
   SCD $5, 0($6)
   BEQ $5, $0, Label
   NOP
```

The atomic sequence shown above is an example of a sequence of instructions to atomically add one to a memory address. The memory address has a 64-bit width. The memory address is assumed to be initially stored in register $6. The Load Linked Doubleword (LLD) instruction is a load instruction, in the MIPS64 instruction set, designed to initiate an atomic sequence when executed. The LLD instruction also loads the 64-bit memory location into register $5 from register $6. The Doubleword Add Immediate Unsigned (DADDIU) instruction adds 1 to the memory address now stored in register $5.

The Store Conditional Doubleword (SCD) instruction is a conditional storing instruction which is typically indicative of the last instruction in the atomic sequence and is designed to store a data word. In the example above, the SCD either updates the 64-bit memory address in register $6 with the content of register $5 and deposits 1 into register $5 indicating successful storage, or simply deposits 0 into register $5 indicating a storage failure. The Branch on EQual (BEQ) is a branch instruction that checks whether the SCD instruction executed successfully, e.g., successful storage, and causes the atomic sequence to be repeated if a failure of the SCD instruction is detected. Specifically, the BEQ compares the content of register $5 to zero. Note that register $0 always reads as zero. If the content of register $5 is equal to zero, e.g., the SCD failed to store the data word, the BEQ directs execution to Label, therefore, causing the atomic sequence to be initiated again by the LLD instruction. If the content of register $5 is not equal to zero, e.g., the SCD succeeded to store the data word, the branch is not taken, and execution continues to any instructions following the atomic sequence. The No Operation (NOP) instruction does nothing.

While instructions such as the LLD and SCD are specific to the MIPS64 architecture, equivalent operations exist, or may exist, in other processor architectures. A person skilled in the art should appreciate that embodiments presented herein are not restricted to the MIPS64 architecture, but are rather applicable to other architectures. In the following, an instruction equivalent to the LLD but not necessarily restricted to the MIPS64 architecture is referred to as a load operation, or instruction, designed to initiate an atomic sequence, or even more generally, an operation or instruction designed to initiate an atomic sequence. Also, an instruction equivalent to the SCD but not necessarily restricted to the MIPS64 architecture is referred to as a conditional storing operation, or instruction.

Implementation of the atomic sequences enabling atomic access may be challenging. Specifically, in a multi-core hardware system, an atomic sequence being executed by a core processor may be interrupted due to action(s) of another core processor. Furthermore, synchronizing memory caches associated with distinct core processors presents a real implementation challenge.

FIG. 1 is a block diagram of a multi-core hardware system 100 illustrating conditional storing of data, according to at least one example embodiment. The hardware system includes multiple core processors, or central processing units (CPUs), 110-1-110*n*, a level-two (L2) data cache 120, a memory component 130, and I/O bridges 140. The memory component 130 is accessible by the multiple CPUs, e.g., 110-1-110-*n*. Each CPU, e.g., 110-1, 110-2, . . . , or 110-*n*, includes a level one (L1) data cache, e.g., 114-1, 114-2, . . . , or 114-*n*, and a write buffer, e.g., 118-1, 118-2, . . . , or 118-*n*, and a write buffer. The hardware system 100 maintains the L1 data caches 114-1-114-2 coherent with respect to the memory component 130. According to at least one example implementation, the L2 data cache 120 is shared by different agents. The agents in the hardware system 100 are the CPUs 110-1-110-*n* and the I/O bridges 140. The L2 data cache 120 includes a controller 125. The L2 data cache is also maintained coherent by the hardware system 100. The I/O bridges 140 may or may not contain any L1 caches. The CPUs 110-1-110-*n* may also contain L1 instruction caches, which may or may not be held coherent by the hardware system 100. Caches are performance-important, since they can provide low-latency and high-bandwidth access to commonly used data.

Figure 2:
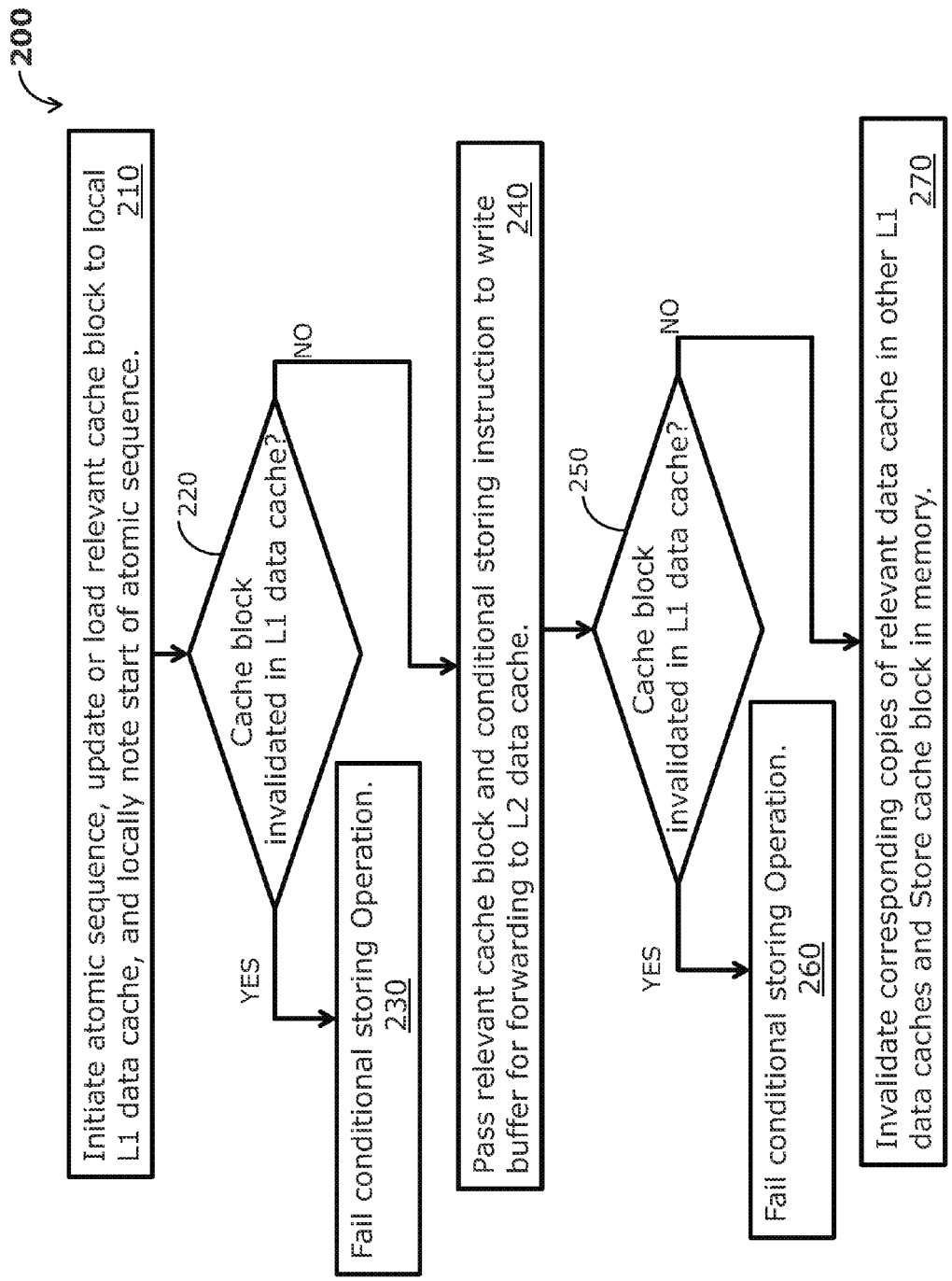
FIG. 2 is a flowchart illustrating a method of conditionally storing data to memory by a core processor in a multi-core hardware system, according to at least one example embodiment.

FIG. 2 is a flowchart illustrating a method 200 of conditionally storing data to memory by a core processor in a multi-core hardware system 100, according to at least one example embodiment. When performing operation(s) on content associated with a memory location, a core processor, e.g., 110-1, usually operates on a local copy of the content. At block 210, the core processor initiates an atomic sequence by executing an instruction designed to initiate an atomic sequence. Executing the instruction designed to initiate an atomic sequence includes loading content associated with a memory location in a cache block data cache, e.g., 114-1 and/or 120. In the example atomic sequence code shown above, register $6 indicates the address of the memory location being accessed by the atomic sequence.

Also, as part of executing the instruction designed to initiate the atomic sequence, the CPU, e.g., 110-1, generates and/or maintains an indication of the atomic sequence initiated and being executed. For example, The CPU, e.g., 110-1, may set a lock flag indicative of the atomic sequence being executed. At block 220, if the relevant cache block, e.g., the cache block storing the loaded content, is invalidated by the controller 125, the conditional storing operation, or atomic sequence, is locally failed by the CPU, e.g., 110-1, at block 230. Otherwise, a memory write/store command, with the content to be stored, is/are passed to the local write buffer, e.g., 118-1, at block 240, for forwarding to the L2 data cache 120. In fact, the L1 data caches 114-1-114-*n* act as writethrough caches. The conditional storing instruction may also be locally failed by the CPU, e.g., 110-1, if the atomic sequence is interrupted.

After receipt of the memory write/store command, with the content to be stored, by the L2 data cache 120, the conditional storing operation may be failed at the L2 data cache 120, for example, if the relevant cache block in the L1 data cache was invalidated. At block 250, a determination is made by the controller 125 on whether the relevant cache block in the L1 data cache was invalidated. If the relevant cache block is determined to be invalidated in the L1 data cache, then the conditional storing is failed, at block 260, by the controller 125. In other words, before executing the conditional storing operation, the controller 125 checks the L1 data cache of the source agent, e.g., 114-1, to check if the relevant cache block was invalidated or still valid. If the relevant cache block in the L1 data cache is determined to be valid, the controller 125 invalidates, at block 270, corresponding copies of the relevant cache block in L1 data caches associated with all agents, e.g., 114-2-114-*n* and the I/O bridges 140, and executes the conditional storing operation. In other words, when the L2 cache 120 receives a memory write/store command, with the content to be stored, it ensures that all copies of the relevant cache block are removed from L1 data caches on any other agent except the source agent, e.g., 114-1, that sent the memory write/store command. At the same block 270, the content to be stored by the conditional storing operation is written/stored to the corresponding memory location in the memory 130. In other words, the invalidation of cache blocks in other agents is performed only if the conditional storing operation is determined to proceed and execute successfully.

The controller 125 is configured to maintain the L1 data caches, e.g., 114-1-114-*n*, coherent by managing a write-invalidate process. Failure to invalidate one or more copies of the memory location's content associated with one or more agents makes the copies of the memory location's content, associated with the L1 data caches, e.g., 114-1-114-*n*, stale/incoherent with respect to the actual memory value.

The invalidating process performed in block 230 may be implemented according to different invalidate mechanisms. According to a first example implementation, the L2 data cache 120 is configured to maintain local data for each coherent L1 data cache indicative of which memory locations have corresponding valid copies, or cache blocks, in the same L1 data cache. The local data for each memory location may be maintained as a local table or using any other data structure. When L2 data cache 120 receives a memory write/store command associated with a memory location from a given agent, the controller 125 determines which L1 data caches are to be invalidated based on the maintained local data corresponding to same agent.

According to a second implementation of the invalidate mechanism, the controller 125 is configured to send an invalidate request to all L1 data caches, perhaps except the L1 data cache managed by the agent that is the source of the memory write/store command, upon receipt, at the L2 data cache 120, of a memory write/store command associated with a memory location. Each agent receiving an invalidate request determines locally whether its L1 data cache contains a copy of the memory location's content. If an agent determines that its L1 data cache contains a copy of the memory location's content, the corresponding cache block holding the copy of the memory location's content in the L1 data cache is invalidated. The second implementation of the invalidate mechanism involves broadcasting, by the controller 125, an invalidate request to all agents for each memory write/store command received at the L2 data cache 120.

According to a third implementation of the invalidate mechanism, the L2 data cache maintains some information for each cache block in the L2 data cache indicative of L1 data caches holding a copy of the same cache block. A simple form of such information for a given cache block may be a one bit parameter per agent. For example, the one bit parameter is set to one if the agents' L1 data cache has a copy of the cache block, and set to zero if the agent's L1 data cache does not have a copy of the cache block. With such information, the controller 125 sends invalidation requests only to agents having copies of the cache block in the L2 data cache 120 associated with a memory write/store command. Even though such simple form uses one bit per agent for a given cache block, the memory used to store the information in the L2 data cache may be significant, especially the hardware system 100 includes many CPUs. For example, if the hardware system 100 includes 48 CPUs, the L2 data cache 120 has a capacity of 16 MB, and the size of each cache block is 128 bytes, storing the information indicative of the agents having copies of each cache block consumes 0.75 MB. Hence, it may be advantageous to use fewer bits of storage per cache block.

In the example method shown in FIG. 2, if the atomic sequence is interrupted, not shown in FIG. 2, or if the relevant cache block is invalidated in the local L1 data cache, e.g., 114-1, before the conditional storing instruction executes, the CPU, e.g., 110-1, locally fails the conditional storing instruction, at block 230, without any interactions with the L2 data cache 120. As such, determining whether to succeed or fail the conditional storing operation is typically based on whether or not the relevant cache block is present in the L1 data cache of the source agent. Specifically, the presence/absence of the relevant cache block in the L2 data cache 120 is not considered in deciding whether to succeed or fail the conditional storing operation. As such, the cache blocks stored in each L1 data cache, e.g., 114-1-114-n, do not necessarily represent a subset of the cache blocks stored in the L2 data cache 120. That is, the contents of the L1 coherent data caches are not forced to be a subset of the content of the L2 data cache 120. If the relevant cache block is not invalidated, the CPU, e.g., 110-1, forwards the conditional storing command to the L2 data cache 120, at block 240. According to at least one example implementation, if the relevant cache block is evicted or invalidated at the L2 data cache 120, before the conditional storing operation executes successfully, the conditional storing operation is failed, by the controller 125, at the L2 data cache 120.

Figure 3:
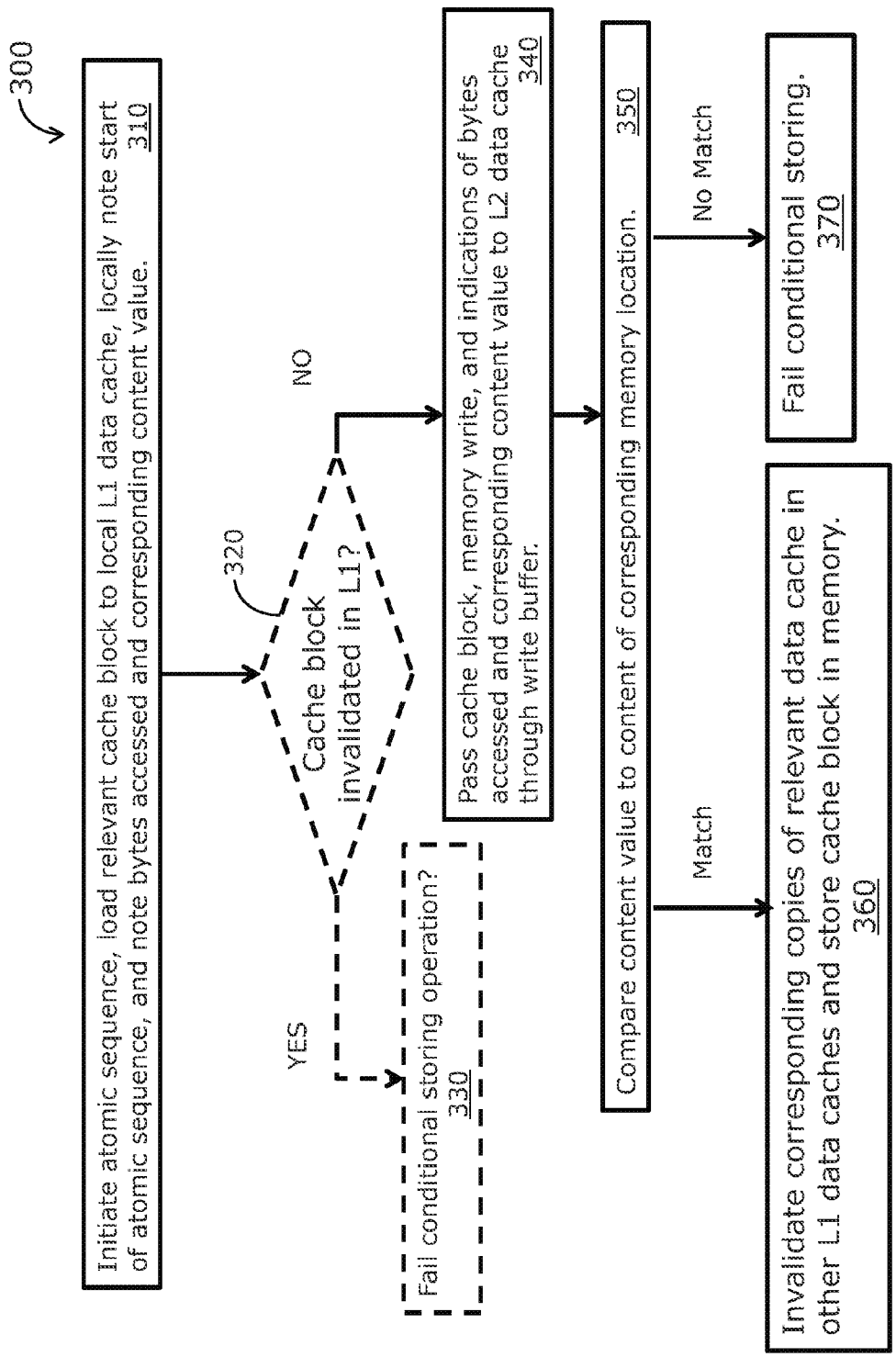
FIG. 3 is a flowchart illustrating a method of conditionally storing data in the memory by employing a compare-and-swap approach, according to at least one example embodiment.

FIG. 3 is a flowchart illustrating a method 300 of conditionally storing data in the memory 130 by employing a compare-and-swap approach, according to at least one example embodiment. According to the embodiments of the method shown in FIG. 3, the set of cache blocks stored at each L1 data cache, e.g., 114-1-114-n, is forced to be a subset of the set of cache blocks stored in the L2 data cache 120. Forcing the cache blocks present at each L1 data cache to be a subset of the cache blocks present in the L2 data cache 120 has broad implications and may create a forward progress problem. For example, assume that the hardware system has 48 CPUs, e.g., n=48, and the L2 data cache 120 has multiple sets, each set has a capacity to hold a maximum of 16 cache blocks. Suppose further that each of the 48 CPUs is attempting to execute an atomic sequence, the atomic sequences referencing different cache blocks atomically. Suppose further that every cache block being referenced atomically happens to map to the exact same set in the L2 cache, with all 48 CPUs competing for the same 16 spaces in the set. It is impossible for these 16 spaces in the set of L2 data cache to simultaneously hold all 48 cache blocks. In this scenario, it may be possible to get into the situation where a first CPU initiates a first atomic sequence and loads its corresponding cache block into the first CPU's L1 data cache and the L2 data cache, but the cache block continually gets removed from the L2 data cache 120, by other CPUs initiating other atomic sequences, before the conditional storing operation of the first atomic sequence has a chance to successfully execute. As such, the hardware system 100 may run into a situation where all conditional storing operations, associated with different CPUs, keep continually failing resulting in system deadlock, if the storing method in FIG. 2 is employed.

At block 310, a CPU, e.g., 110-1, initiates an atomic sequence by executing an instruction/operation, e.g., LLD in MIPS64, designed to initiate an atomic sequence. In executing the instruction designed to initiate the atomic sequence, the CPU, e.g., 110-1, is configured to load content associated with a memory location, being accessed by the atomic sequence into a cache block of a data cache, e.g., 114-1 and/or 120. Executing the instruction designed to initiate the atomic sequence also includes generating and/or maintaining, by the CPU, an indication that an atomic sequence is started and/or being executed. Also, as part of executing the instruction designed to initiate the atomic sequence, the CPU remembers which bytes were accessed by the instruction initiating the atomic sequence, as well as the corresponding content value(s) provided as a result of the load operation. That is a copy of the loaded content and an indication of the corresponding memory address are maintained. For example, in the atomic sequence code presented above, the content value(s) provided as the result of the load operation is the value of register $5 after execution of the LLD instruction in the atomic sequence. In other words, the value of the content loaded by the instruction initiating the atomic sequence is remembered by the CPU.

At block 320, the CPU may check whether or not the relevant cache block, e.g., cache block including content loaded by the instruction initiating the atomic sequence, is invalidated in the local L1 data cache by the controller 125. If the relevant cache block is invalidated in the local L1 data cache, the CPU may determine, at block 330, whether or not to fail the conditional storing operation. The blocks 320 and 330 may be optional. In other words, according to an example implementation, the conditional storing operation is never locally failed by the CPU if the relevant cache block is invalidated, by the controller 125, in the local L1 data cache. As such, the checking in 320 may be omitted and the process goes from block 310 straight to block 340. According to another example implementation, the processes at blocks 320 and 330 are performed. In such case, the conditional storing operation is failed, or passed to continue executing, at the block 330 based on a counter value. According to yet another implementation, the hardware system 100 may operate according to one of two modes. In a first mode, the CPU never locally fails the conditional storing operation if the relevant cache block is invalidated in the local L1 data cache by the controller 125. In the second mode, the CPU usually determines, at block 330, whether or not to locally fail the conditional storing operation, if the relevant cache block is invalidated in the local L1 data cache by the controller 125, based on a counter's value (not shown in FIG. 3).

According to at least one aspect, the deadlock situation described above is a reason not to always fail the conditional storing operation locally at block 330. If the CPU always fails the conditional storing operation at block 330, the deadlock scenario may become possible. According to at least one other aspect, never locally failing the conditional storing operation at block 330 may be suboptimal. Specifically, on one hand, performance may typically be improved by locally failing the conditional storing operation at block 330. On another hand, not failing the conditional storing operation at block 330 makes it possible to succeed the conditional storing operation even though another CPU modified content of the memory location and then restored the content to its original value after the atomic sequence was initiated and prior to successful execution of the conditional storing operation. The modification/invalidation of the cache block at the local L1 data cache may result in the ABA problem known in the art.

According to at least one aspect, the counter is a 3-bit counter. The counter is cleared each time the hardware system 100 and/or the corresponding CPU is/are reset. The counter is also cleared each time a conditional storing operation, associated with an atomic sequence initiated by the CPU, is locally failed due to a cause other than an invalidation of a cache block by the controller 125. The counter is also cleared each time a conditional storing operation is forwarded by the CPU to the L2 data cache 120. The counter is incremented with every local failure due solely to receipt of invalidate request, to invalidate a cache block, from the controller 125. Given the counter's value, the CPU does not locally fail a conditional storing operation if the counter's value is at its maximum and the only reason to fail the conditional storing operation is an invalidate request from the controller. As such, the conditional storing operation is failed most of the time but not always at block 330. A person skilled in the art should appreciate that the counter may be defined, cleared, or incremented in a different way.

The conditional storing operation is failed, not shown in FIG. 3, locally by the CPU each time the corresponding atomic sequence is interrupted before the corresponding conditional storing operation executes successfully. At block 340, if the conditional storing operation is not failed locally by the corresponding CPU, the memory write/store operation, and indication(s) of the bytes accessed and the corresponding content value loaded at the time the atomic sequence was initiated are forwarded to the L2 data cache 120 through the local write buffer.

When the conditional storing operation is passed to the L2 data cache 120, the corresponding cache block may not be present in the L2 data cache. In other words, the cache block, in the L2 data cache 120, storing content by the atomic sequence may be overwritten, or invalidated, by another agent. According to at least one aspect, deadlock scenario described above is a reason not to always fail the conditional storing operation in such a case. If the controller always fails the conditional storing operation in such situation, e.g., cache block not present in L2 data cache, the deadlock scenario becomes possible. According to at least another aspect, never failing the conditional storing operation in this situation may increase the possibility of the ABA problem. However, eviction of the cache block from the L2 data cache 120 automatically forces the cache block to be evicted from the local L1 data cache. Hence, depending on the local failure mode due to invalidation of the cache block at the local L1 data cache by the controller 125, such cases where may be rare since in most of the cases, the conditional storing operation is failed at block 330. According to at least one example embodiment, the conditional storing operation is never failed due to an absence of the cache block in the L2 data cache. According to at least one example embodiment, a counter approach as presented above may be employed to determine whether to fail or succeed the conditional storing operation due to an absence of the cache block in the L2 data cache.

At block 350, the controller 125 performs the compare-and-swap operation. Specifically, the controller 125 compares the copy of the content value maintained, corresponding to the bytes accessed, to the content stored in the corresponding memory location. The corresponding memory location is determined based on the indication of the bytes accessed forwarded from the CPU with the memory write operation. If a match is found, copies of the relevant cache block are invalidated in other agents and the conditional storing operation is executed by storing/writing content to be stored to the memory location at block 360. Otherwise, the conditional storing operation is failed at block 370, in which case the atomic sequence may be initiated again.

At block 360, copies of the relevant cache block are invalidated by the controller 125 in all L1 data caches, e.g., 114-2-114-*n* associated with agents other than the source agent. The method described in FIG. 2 is well-suited to the first implementation of the invalidate mechanism, but more poorly suited to the second and third implementations of the invalidate mechanisms. In particular, the controller may immediately determine whether to succeed or fail the conditional storing operation by consulting its copy of the cache blocks, or cache tags, of the L1 data caches, e.g., 114-1-114-*n*. With the second and third implementations of the invalidate mechanism, it is more difficult for the combination of the controller 125 and the CPU to determine with certainty whether to fail or succeed the conditional storing operation. According to one aspect, the second implementation of the invalidate mechanism is employed at block 350. According to another aspect, the third implementation of the invalidate mechanism is employed at block 350. According to yet another aspect, a variant of the third implementation of the invalidate mechanism is employed at block 350. For example, the L2 data cache may maintain bit parameters for only a subset of the agents, but not all the agents. For one example, the L2 cache controller may be able to precisely track only up to N agents, and if more than N agents have a copy of the block, the controller may conservatively assume that the cache block could be in any cache. Those skilled in the art will recognize that there are many variants of the third implementation.

According to at least one example embodiment, instead of simply passing typical conditional storing operation to the L2 data cache, an atomic memory compare-and-swap operation is passed to the L2 data cache. As such the deadlock scenario is avoided. Also, employing the compare and swap approach makes the use of the second or third implementation of the invalidate mechanism, or a variant thereof, more straightforward. A person skilled in the art should appreciate that by modifying how the hardware system 100 executes an atomic sequence, e.g., performing the compare-and-swap operation as part of the atomic sequence, enables avoiding the deadlock scenario described above.

A person skilled in the art should appreciate that embodiments presented herein may be easily generalized to a hardware system with more data cache levels in any of the agents.

Also, other embodiments may involve only the L2 data cache 120. For example, the content loaded is directly loaded in the L2 data cache 120 and the local L1 data cache, in this case, is not used. As such, the conditional storing operation executes successfully if the atomic sequence is not interrupted and if the compare- and swap operation results in a match between the copy of the content maintained and the content stored in the corresponding memory location. The conditional storing operation may be determined to succeed or fail based on the status of the relevant cache block in the L2 data cache, but not based on what happens in any L1 data cache.

While this invention has been particularly shown and described with references to example embodiments thereof, it will be understood by those skilled in the art that various changes in form and details may be made therein without departing from the scope of the invention encompassed by the appended claims.

What is claimed is:

1. A method of conditionally storing data, the method comprising:
   initiating, by a core processor, an atomic sequence by executing a load operation designed to initiate the atomic sequence, executing the load operation designed to initiate the atomic sequence includes loading content of a memory location and maintaining an address indication of the memory location and a copy of the corresponding content loaded; and
   performing a conditional storing operation, the conditional storing operation includes a compare-and-swap operation, the compare-and-swap operation executed by a controller associated with a cache memory based on the address indication of the memory location and the copy of the corresponding content maintained;
   wherein the loaded content is loaded in a first cache memory and the cache memory with which the controller is associated is a second memory cache, the method further comprising providing, by the core processor, the address indication of the memory location and the copy of the corresponding content to the second cache memory.

2. The method as recited in claim 1, wherein performing the conditional storing operation includes performing the conditional storing operation upon determining that one or more constraints are satisfied.

3. The method as recited in claim 2, wherein the one or more constraints include the atomic sequence not being interrupted at the core processor.

4. The method as recited in claim 2, wherein the one or more constraints include the conditional store operation not being failed by the core processor.

5. The method as recited in claim 4, wherein the conditional storing operation is failed by the core processor if the memory location loaded is invalidated in the first memory cache prior to performing the conditional store operation, and based on a value of a counter, the counter being indicative of a number of times the conditional store operation is failed by the core processor due to an invalidation instruction from the second cache memory.

6. The method as recited in claim 5, wherein the counter is reset upon resetting the core processor or if the conditional store operation is failed by the core processor due to any reason other than an invalidation instruction from the second cache memory.

7. The method as recited in claim 5, wherein the counter is incremented each time the conditional storing operation is failed by the core processor due to an invalidation instruction from the second cache memory.

8. The method as recited in claim 2, wherein the one or more constraints include the conditional storing operation not being failed at the second cache memory.

9. The method as recited in claim 8, wherein the conditional storing operation is failed by the controller if the memory location loaded, upon being passed to the second cache memory, is invalidated in the second cache memory prior to performing the conditional storing operation.

10. The method as recited in claim 1, wherein the compare-and-swap operation includes:
    comparing, by the controller, the copy of the content maintained with content corresponding to the memory location;
    performing, by the controller, the conditional store operation if a match is found between the copy of the content maintained and the content corresponding to the memory location; and
    failing, by the controller, the conditional storing operation if no match is found between the copy of the content maintained and the content corresponding to the memory location.

11. A multi-core processor device comprising:
    multiple core processors, each having a corresponding first cache memory; and
    a second cache memory including a corresponding controller, the second cache memory being accessible by the multiple core processors,
    a core processor of the multiple core processors being configured to:
       initiate the atomic sequence by executing a load operation designed to initiate an atomic sequence, executing the load operation designed to initiate the atomic sequence includes loading content of a memory location and maintaining an address indication of the memory location and a copy of the corresponding content loaded; and
       the controller being configured to perform a conditional storing operation, the conditional storing operation includes a compare-and-swap operation, the compare-and-swap operation being executed by the controller based on the address indication of the memory location and the copy of the corresponding content maintained;
    wherein the loaded content is loaded in the first cache memory of the core processor, the core processor is further configured to provide the address indication of the memory location and the copy of the corresponding content to the second cache memory.

12. The multi-core processor device as recited in claim 11, wherein the conditional storing operation is performed by the controller upon determining that one or more constraints are satisfied.

13. The multi-core processor device as recited in claim 12, wherein the one or more constraints include the atomic sequence not being interrupted at the core processor.

14. The multi-core processor device as recited in claim 12, wherein the one or more constraints include the conditional storing operation not being failed by the core processor.

15. The multi-core processor device as recited in claim 14, wherein the core processor is configured to fail the conditional storing operation if the content of the memory location loaded is invalidated in the first memory cache prior to performing the conditional storing operation and based on a value of a counter, the counter being indicative of a number of times the conditional storing operation is failed by the core processor due to an invalidation instruction from the controller.

16. The multi-core processor device as recited in claim 15, wherein the core processor is further configured to reset the counter upon a reset of the core processor or if the conditional storing operation is failed by the core processor due to any reason other than an invalidation instruction from the controller.

17. The multi-core processor device as recited in claim 16, wherein the core processor is further configured to increment the counter each time the conditional storing operation is failed by the core processor due to an invalidation instruction from the controller.

18. The multi-core processor device as recited in claim 12, wherein the one or more constraints include the conditional storing operation not being failed at the second cache memory.

19. The multi-core processor device as recited in claim 12, wherein the controller is configured to fail the conditional storing operation if the memory location loaded, upon being passed to the second memory cache, is invalidated in the second memory cache prior to performing the conditional store operation.

20. The multi-core processor device as recited in claim 11, wherein in executing the compare-and-swap operation, the controller is configured to:

compare the copy of the content maintained with content corresponding to the memory location;

perform the conditional storing operation if a match is found between the copy of the content maintained and the content corresponding to the memory location; and fail the conditional storing operation if no match is found between the copy of the content maintained and the content corresponding to the memory location.

21. A processor device comprising:

a core processor having a first cache memory, the core processor configured to:

initiate an atomic sequence by executing a load operation designed to initiate the atomic sequence, executing the load operation designed to initiate the atomic sequence includes loading content of a memory location and maintaining an address indication of the memory location and a copy of the corresponding content loaded; and a controller configured to perform a conditional storing operation, the conditional storing operation includes a compare-and-swap operation, the compare-and-swap operation being executed by the controller based on the address indication of the memory location and the copy of the corresponding content maintained;

wherein the loaded content is loaded in the first cache memory of the core processor, the core processor is further configured to provide the address indication of the memory location and the copy of the corresponding content to a second cache memory associated with the controller.

* * * * *